United States Patent
Hua et al.

(10) Patent No.: US 11,271,467 B2
(45) Date of Patent: Mar. 8, 2022

(54) COAXIAL DOUBLE-ROTOR VARIABLE-SPEED ELECTROMAGNETIC DRIVE

(71) Applicant: SOUTHEAST UNIVERSITY, Nanjing (CN)

(72) Inventors: Wei Hua, Nanjing (CN); Peixin Wang, Nanjing (CN); Gan Zhang, Nanjing (CN); Baoan Wang, Nanjing (CN); Ming Cheng, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 16/979,536

(22) PCT Filed: Feb. 27, 2020

(86) PCT No.: PCT/CN2020/076869
§ 371 (c)(1),
(2) Date: Sep. 10, 2020

(87) PCT Pub. No.: WO2021/000588
PCT Pub. Date: Jan. 7, 2021

(65) Prior Publication Data
US 2021/0359587 A1 Nov. 18, 2021

(30) Foreign Application Priority Data
Jul. 1, 2019 (CN) .......................... 201910586324.0

(51) Int. Cl.
*H02K 16/00* (2006.01)
*H02K 49/10* (2006.01)
(Continued)

(52) U.S. Cl.
CPC ............. *H02K 49/106* (2013.01); *H02K 1/16* (2013.01); *H02K 1/2706* (2013.01); *H02K 3/12* (2013.01); *H02K 7/20* (2013.01)

(58) Field of Classification Search
CPC .............................. H02K 16/00; H02K 16/02
See application file for complete search history.

(56) References Cited

U.S. PATENT DOCUMENTS 2,970,249 A * 1/1961 Mazur .................... H02K 17/38
318/46
6,848,165 B1 * 2/2005 Furuse ................... H02K 16/02
29/596

(Continued)

FOREIGN PATENT DOCUMENTS

| CN | 1571250 A | 1/2005 |
|----|-----------|--------|
| CN | 102497074 A | 6/2012 |

(Continued)

*Primary Examiner* — Dang D Le
(74) *Attorney, Agent, or Firm* — Bayramoglu Law Offices LLC

(57) ABSTRACT

A coaxial double-rotor variable-speed electromagnetic drive includes an external rotor, an end cover, a load shaft, a stator, and an internal rotor, the external rotor, the load shaft, the stator, and the internal rotor being coaxially arranged. The end cover includes a first end cover and a second end cover that are respectively disposed at two ends of the drive, the external rotor is slidably connected to the two end covers separately by bearings, the load shaft is slidably connected to the first end cover and the inner side of the external rotor separately by bearings, the stator is fixed on the inner side of the first end cover and disposed inside the external rotor, air gaps are kept separately between the stator and the internal rotor and between the stator and the external rotor, the internal rotor is sleeved on the load shaft and is disposed inside the stator.

9 Claims, 4 Drawing Sheets

(51) Int. Cl.
*H02K 1/16* (2006.01)
*H02K 1/2706* (2022.01)
*H02K 3/12* (2006.01)
*H02K 7/20* (2006.01)

(56) References Cited

U.S. PATENT DOCUMENTS 7,750,521 B2* 7/2010 Qu .................. H02K 7/1823
310/112
8,987,962 B2* 3/2015 Kim ................... H02K 16/00
310/112

FOREIGN PATENT DOCUMENTS

| CN | 203933343 U | 11/2014 |
| CN | 104767332 A | 7/2015 |
| CN | 110299815 A | 10/2019 |
| JP | H0318268 A | 1/1991 |

* cited by examiner

COAXIAL DOUBLE-ROTOR VARIABLE-SPEED ELECTROMAGNETIC DRIVE

CROSS-REFERENCE TO THE RELATED APPLICATIONS

This application is the national stage entry of International Application No. PCT/CN2020/076869, filed on Feb. 27, 2020, which is based upon and claims priority to Chinese Patent Application No. 201910586324.0, filed on Jul. 1, 2019, the entire contents of which are incorporated herein by reference.

TECHNICAL FIELD

The present invention belongs to the field of electromagnetic speed-regulation driving technologies and relates to an electromagnetic driving device, and in particular, to a coaxial double-rotor variable-speed electromagnetic drive.

BACKGROUND

At present, a gear-based transmission system is normally used in a conventional mechanical power transmission system. There are contact and gaps between gears in the system, and noise and wear tend to occur during operation. In addition, such a transmission system generally can only output speed at a specific transmission ratio, and speed regulation can only be implemented by changing the speed of a power source. Moreover, once the operation status of a load is suddenly changed, the power source is prone to damage, leading to high economic loss.

Chinese Patent NO. 201420266548.6 discloses a "novel permanent magnet eddy current coupling speed regulator" that implements a transmission mode without mechanical connection between a power source and a load, to achieve adaptability to a relatively severe on-site environment, significant effects of vibration reduction and vibration isolation, and low noise, thereby increasing the reliability and service life of the entire system. Although the technology can implement the transmission mode without mechanical connection between the power source and the load, the output speed of a load end is less than the input speed of the power source, and the transmission ratio is greater than 1:1. Obviously, the speed regulation range is narrow, and the transmission power cannot be regulated.

SUMMARY

To resolve the foregoing problems, this present invention provides a coaxial double-rotor variable-speed electromagnetic drive that can adjust a transmission power, has a small transmission ratio, and a wide speed regulation range, to implement that there is no mechanical connection between a power source and a load and at the same time resolve the disadvantages such as a large transmission ratio, a narrow speed regulation range, and a reduced-speed output in transmission technologies such as an eddy current speed regulation coupler.

To achieve the foregoing objective, the present invention provides the following technical solutions:

A coaxial double-rotor variable-speed electromagnetic drive is provided, including an external rotor, an end cover, a load shaft, a stator, and an internal rotor, the external rotor, the load shaft, the stator, and the internal rotor being coaxially arranged, where the end cover includes a first end cover and a second end cover that are respectively disposed at two ends of the drive, the external rotor is slidably connected to the two end covers separately by bearings, the load shaft is slidably connected to the first end cover and the inner side of the external rotor separately by bearings, the stator is fixed on the inner side of the first end cover and is disposed inside the external rotor, air gaps are kept separately between the stator and the internal rotor and between the stator and the external rotor, the internal rotor is sleeved on the load shaft and is disposed inside the stator, and an air gap is kept between the internal rotor and the stator.

Further, the external rotor includes a drive shaft, a rotor iron core, and permanent magnets, the rotor iron core and the drive shaft form an integrated structure, and opposite poles of the permanent magnets are alternately arranged and uniformly distributed on the inner surface of the rotor iron core.

Further, the stator includes a stator iron core, interleaved windings, and a magnetic-isolated ring, the inner surface and the outer surface of the stator iron core are provided with grooves, a quantity of the grooves in the inner surface is equal to a quantity of the grooves in the outer surface, the magnetic-isolated ring is disposed at a yoke portion of the stator iron core, and the two sides of the interleaved windings are respectively disposed in grooves in the inner surface and the grooves in the outer surface of the stator.

Further, the stator iron core is formed by stacking silicon steel sheets in the axial direction Further, all coils of the interleaved windings have the same winding direction, and end portions of two adjacent coils are interleaved with each other.

Further, a quantity of pairs of magnetic field poles of the permanent magnets of the external rotor is 2n times a quantity of pairs of magnetic field poles generated by inner windings of the stator, and n is an integer.

Further, an arrangement mode of outer groove windings of the interleaved windings of the stator is ABCABCAB-CABC, an arrangement mode of inner groove windings may be AABBCCAABBCC or AAAABBBBCCCC, and a corresponding transmission ratio is 1:2 or 1:4.

Further, the interleaved windings are connected in series to a slide rheostat.

Further, the internal rotor is made of a solid ferromagnetic material or a solid copper clad material.

Compared with the prior art, the present invention has the following advantages and beneficial effects:

According to the present invention, a double-rotor structure is used, there is no mechanical wear, the system operates stably, and the noise is low. With the structure of the present invention, an output rotational speed may be greater than an input rotational speed, the speed regulation range becomes wider, the transmission ratio is low, and the transmission efficiency is high. An electromagnetic structure is arranged between the power source and the load, so that the system is highly reliable and has a long service life. In addition, the windings may be connected in series to the slide rheostat to implement active adjustment of the transmission power.

1—external rotor, 2.1—first end cover, 2.2—second end cover, 3—load shaft, 4—magnetic-isolated ring, 5Z—stator, 5—stator iron core, 6—internal rotor, and 7—interleaved winding.

DETAILED DESCRIPTION OF THE EMBODIMENTS

The following describes the technical solutions provided in the present invention in detail with reference to specific embodiments. It should be understood that the following specific implementations are merely intended to describe the present invention rather than to limit the scope of the present invention.

Figure 1:
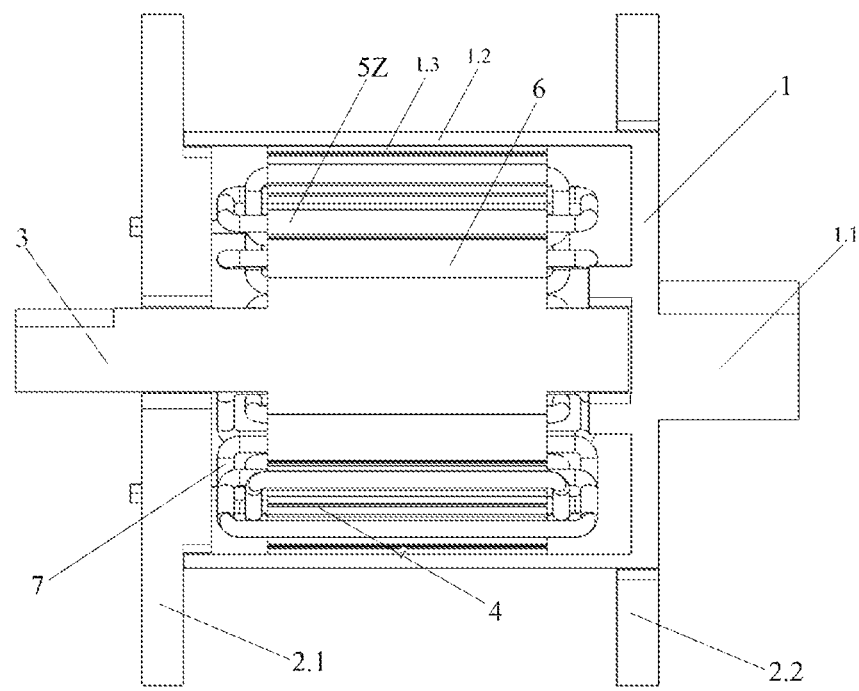
FIG. 1 is a schematic overall cross-sectional view of a coaxial double-rotor variable-speed electromagnetic drive according to the present invention.
Figure 2:
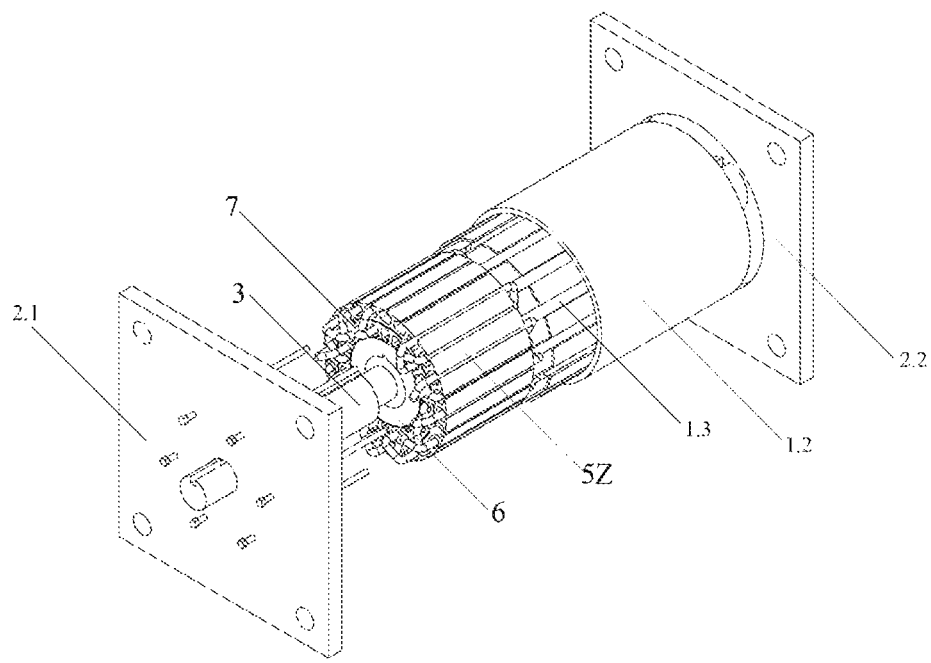
FIG. 2 is a schematic exploded view of an overall structure of a coaxial double-rotor variable-speed electromagnetic drive according to the present invention.

The present invention provides a coaxial double-rotor variable-speed electromagnetic drive, which has an overall structure shown in FIG. 1 and FIG. 2 and includes components such as an external rotor 1, an end cover, a load shaft 3, a stator 5Z, and an internal rotor 6. The external rotor 1, the load shaft 3, the stator 5Z, and the internal rotor 6 are coaxial, and particular air gaps are kept separately between the external rotor 1 and the stator 5Z and between the internal rotor 6 and the stator 5Z. The end cover includes a first end cover 2.1 and a second end cover 2.2 that are respectively disposed at two ends of the drive. The external rotor 1 is slidably connected to the first end cover 2.1 and the second end cover 2.2 separately by bearings. The load shaft 3 is slidably connected to the first end cover 2.1 and the inner side of the external rotor 1 separately by bearings. The load shaft 3 is coaxial with the external rotor 1. The stator 5Z is fixed on the inner side of the first end cover 2.1 by a fixing nut or the like and is disposed inside the external rotor. The internal rotor 6 is sleeved in the middle of the load shaft 3 and is disposed inside the stator 5Z.

Specifically, the structure of the external rotor is shown in FIG. 1 and FIG. 2 and is formed by a rotor iron core 1.2, permanent magnets 1.3, and a drive shaft 1.1. The drive shaft 1.1 and the rotor iron core 1.2 form an integrated structure. The drive shaft 1.1 is a component connected to an external power source. The permanent magnets 1.3 are uniformly attached to the inner surface of the external rotor iron core 1.2. N poles and S poles are alternately distributed. The external rotor is slidably connected to the first end cover 2.1 and the second end cover 2.2 separately by bearings. A bearing is disposed on the inner side of the external rotor. The external rotor is coaxial with the load shaft and is slidably connected to one end of the load shaft.

The internal rotor is made of a cylindrical solid ferromagnetic material and is hollow inside. The internal rotor may be a solid copper-clad structure or an asynchronous motor rotor structure such as a squirrel cage.

Figure 3:
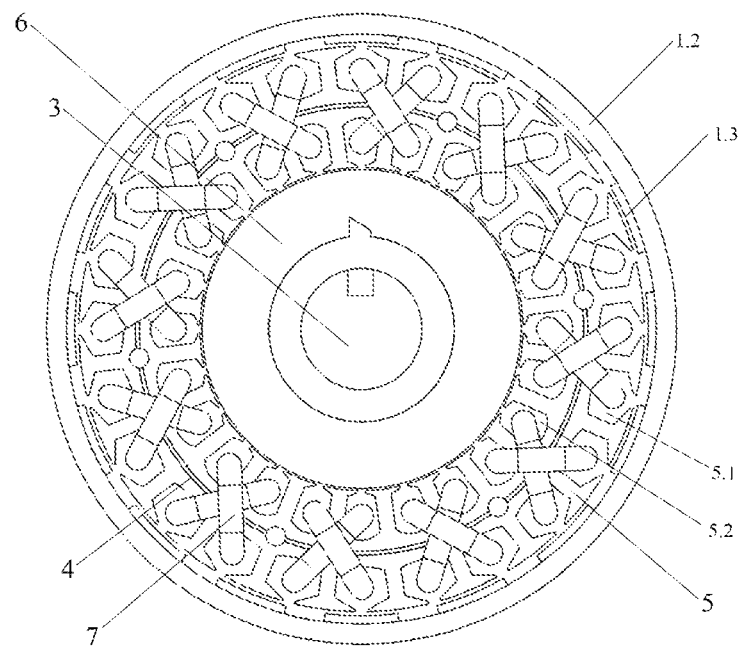
FIG. 3 is a schematic diagram of the mounting of an external rotor, a stator, and an internal rotor.
Figure 4:
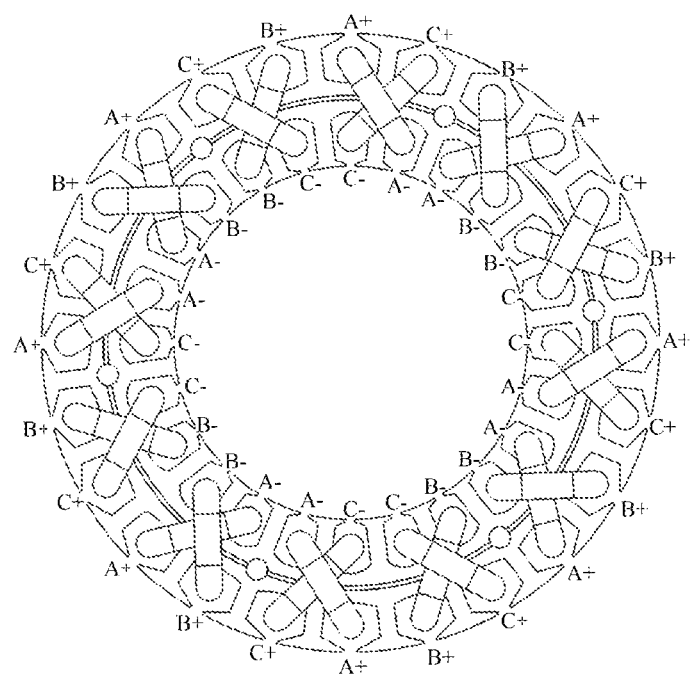
FIG. 4 is a schematic diagram of windings with an input/output speed ratio of 1:2.
Figure 5:
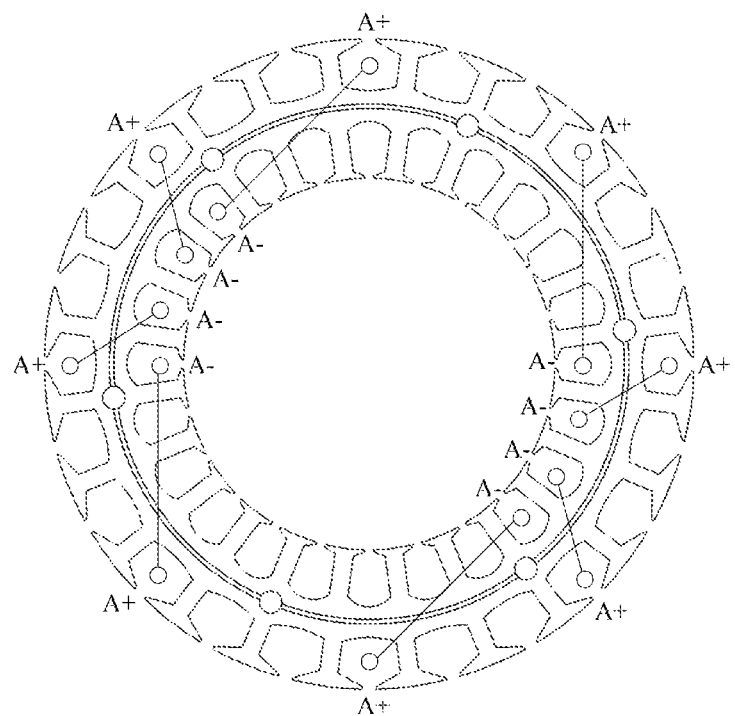
FIG. 5 is a schematic diagram of single-phase windings with an input/output speed ratio of 1:4.

The structure of the stator 5Z is shown in FIG. 3, FIG. 4, and FIG. 5 and includes a stator iron core 5, interleaved windings 7, and a magnetic-isolated ring 4. The stator iron core 5 is formed by stacking silicon steel sheets in the axial direction. The outer surface and the inner surface of the stator iron core 5 are uniformly provided with stator outer grooves 5.1 and stator inner grooves 5.2 in the axial direction respectively. A quantity of the stator inner grooves is equal to a quantity of the stator outer grooves. One side of the interleaved winding coil is arranged in the stator outer groove, and the other side of the interleaved winding coil is arranged in the stator inner groove. (two sides of the interleaved winding coils are respectively arranged in the stator outer and inner grooves,) The magnetic-isolated ring is disposed at a yoke portion of the stator iron core to limit the coupling of an internal magnetic field and an external magnetic field of the stator.

The structure of the interleaved windings 7 is shown in FIG. 3 and FIG. 4. All winding coils have the same winding direction. All winding coils have the same winding direction, as shown in FIG. 4 in which the '+' and '−' indicate the opposite direction. End portions of two adjacent winding coils have an interleaved structure. According to different winding structures, a quantity of pairs of magnetic field poles of the permanent magnets of the external rotor is 2n times a quantity of pairs of magnetic field poles generated by inner windings of the stator, and n is an integer. Three-phase windings are used as an example. As shown in FIG. 4, the stator outer winding coils are arranged in the order of ABCABCABCABC in the counterclockwise direction in FIG. 4. Inner winding coils are arranged in the order of AABBCCAABBCC in the clockwise direction in FIG. 4. As shown in FIG. 4, a transmission ratio is 1:2.

Further, as shown in FIG. 5, the inner coils may be AAAABBBBCCCC, and a transmission ratio is 1:4. Further, a transmission structure with different transmission ratios of 1:8, 1:16 or the like may be disposed. According to the solution provided in the present invention, an output rotational speed of an output shaft can be greater than an input rotational speed of the external rotor.

As an improvement, the interleaved windings may be connected in series to a slide rheostat, so that a transmission power transmitted from the external rotor side to the internal rotor side can be adjusted.

Figure 6:
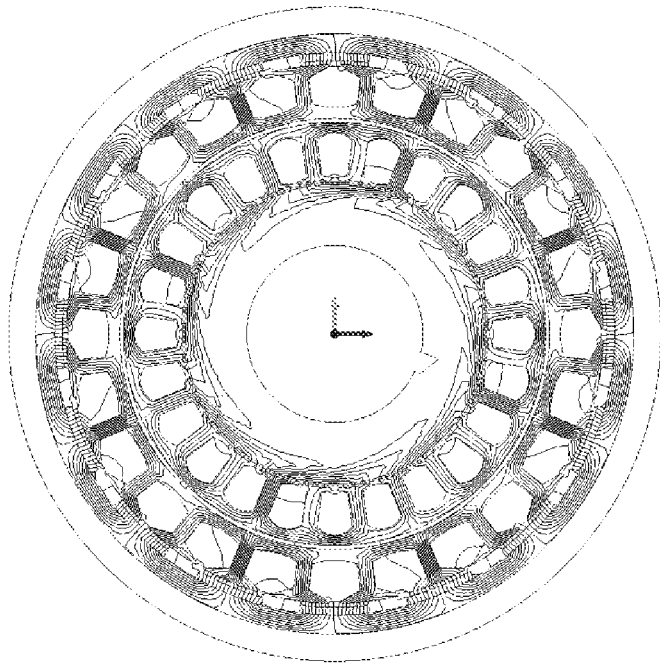
FIG. 6 is a distribution diagram of flux linkages inside a stator and a rotor when a coaxial double-rotor variable-speed electromagnetic drive is working according to the present invention.
Figure 7:
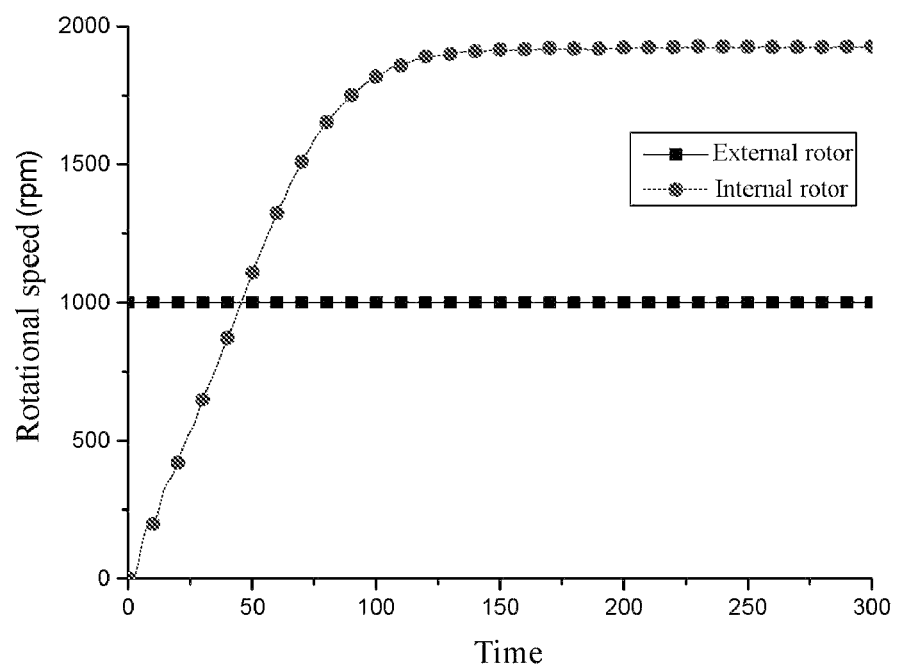
FIG. 7 is a schematic simulation diagram of finite element simulation of the rotational speeds of an internal rotor and an external rotor.

The working principle of the coaxial double-rotor variable-speed electromagnetic drive with the structure is as follows:

As shown in FIG. 6, after the external rotor 1 is connected to the external power source, the external rotor 1 rotates along with the external power source, the outer coil of the stator cuts magnetic fields of the permanent magnets to generate an alternating electromotive force, an alternating current is generated in the windings, and the inner coil of the stator then forms a rotating magnetic field. As shown in FIG. 7, according to the law of electromagnetic induction and the principle of an asynchronous motor, a rotating magnetic field inside the rotor drives the internal rotor to rotate.

The technical means disclosed in the solutions of the present invention are not limited to the technical means disclosed in the foregoing implementations, and also includes technical solutions including any combination of the foregoing technical features. It should be noted that a person of ordinary skill in the art may make several improvements and modifications without departing from the principle of the present invention. All such modifications and modifications shall fall within the protection scope of the present invention.

What is claimed is:

1. A coaxial double-rotor variable-speed electromagnetic drive, comprising an external rotor,
two end covers,
a load shaft,
a stator, and
an internal rotor,
the external rotor, the load shaft, the stator, and the internal rotor being coaxially arranged, wherein the two end covers comprise a first end cover and a second end cover,
wherein the first end cover and the second end cover are respectively disposed at two ends of the coaxial double-rotor variable-speed electromagnetic drive,
the external rotor is slidably connected to the two end covers separately,
the load shaft is slidably connected to the first end cover and an inner side of the external rotor separately,
the stator is fixed on an inner side of the first end cover and is disposed inside the external rotor,
a plurality of air gaps are kept separately between the stator and the internal rotor and between the stator and the external rotor, and
the internal rotor is sleeved on the load shaft and is disposed inside the stator;
wherein the stator comprises a stator iron core and a plurality of interleaved windings, an inner surface of the stator iron core is provided with a first plurality of grooves and an outer surface of the stator iron core is provided with a second plurality of grooves, a quantity of the first plurality of grooves in the inner surface of the stator iron core is equal to a quantity of the second plurality of grooves in the outer surface of the stator iron core, and two sides of the plurality of interleaved windings are respectively disposed in the first plurality of grooves in the inner surface of the stator iron core and the second plurality of grooves in the outer surface of the stator iron core;
wherein a first side of the interleaved winding coil is arranged in the stator outer groove, and a second side of the interleaved winding coil is arranged in the stator inner groove.

2. The coaxial double-rotor variable-speed electromagnetic drive according to claim 1, wherein the external rotor comprises a drive shaft, a rotor iron core, and a plurality of permanent magnets, the rotor iron core and the drive shaft form an integrated structure, and the plurality of permanent magnets are uniformly distributed on an inner surface of the rotor iron core, and a polarity of arbitrarily two adjacent permanent magnets is opposite.

3. The coaxial double-rotor variable-speed electromagnetic drive according to claim 1, wherein the stator further comprises a magnetic-isolated ring, the magnetic-isolated ring is disposed at a yoke portion of the stator iron core.

4. The coaxial double-rotor variable-speed electromagnetic drive according to claim 3, wherein the stator iron core is formed by stacking a plurality of silicon steel sheets in an axial direction.

5. The coaxial double-rotor variable-speed electromagnetic drive according to claim 3, wherein all coils of the plurality of interleaved windings have a same winding direction, and a plurality of end portions of two adjacent coils are interleaved with each other.

6. The coaxial double-rotor variable-speed electromagnetic drive according to claim 2, wherein a quantity of pairs of magnetic field poles of the plurality of permanent magnets of the external rotor is 2n times a quantity of pairs of magnetic field poles generated by a plurality of inner windings of the stator, and n is an integer.

7. The coaxial double-rotor variable-speed electromagnetic drive according to claim 6, wherein an arrangement mode of a plurality of outer groove windings of the plurality of interleaved windings of the stator is ABCABCABCABC, an arrangement mode of a plurality of inner groove windings is AABBCCAABBCC or AAAABBBBCCCCC, and a corresponding transmission ratio is 1:2 or 1:4.

8. The coaxial double-rotor variable-speed electromagnetic drive according to claim 3, wherein the plurality of interleaved windings is connected in series to a slide rheostat.

9. The coaxial double-rotor variable-speed electromagnetic drive according to claim 1, wherein the internal rotor is made of a solid ferromagnetic material or a solid copper clad material.

* * * * *